United States Patent [19]
Obayashi et al.

[11] Patent Number: 5,841,862
[45] Date of Patent: Nov. 24, 1998

[54] MOBILE RADIO COMMUNICATIONS APPARATUS

[75] Inventors: Arata Obayashi, Hino; Masayuki Tanaka, Kokubunji; Masatomo Kanbara, Hino, all of Japan

[73] Assignee: Kabushiki Kaisha Toshiba, Kawasaki, Japan

[21] Appl. No.: 530,371

[22] PCT Filed: Apr. 11, 1994

[86] PCT No.: PCT/JP94/00602

§ 371 Date: Oct. 12, 1995

§ 102(e) Date: Oct. 12, 1995

[87] PCT Pub. No.: WO94/24778

PCT Pub. Date: Oct. 27, 1994

[30] Foreign Application Priority Data

Apr. 15, 1993 [JP] Japan ................................. 5-088574

[51] Int. Cl.⁶ .................................................. H04L 9/00
[52] U.S. Cl. ............................ 380/9; 380/49; 375/216; 455/776.1; 455/425
[58] Field of Search ........................ 380/9, 23, 46, 380/49; 455/33.1, 33.2, 54.1, 226.1, 423; 375/216

[56] References Cited

U.S. PATENT DOCUMENTS

| | | | |
|---|---|---|---|
| 5,091,942 | 2/1992 | Dent | 380/46 |
| 5,199,031 | 3/1993 | Dahlin | 455/33.1 |
| 5,257,401 | 10/1993 | Dahlin et al. | 455/33.2 |
| 5,335,355 | 8/1994 | Tanaka et al. | 455/33.1 |
| 5,396,653 | 3/1995 | Kivari et al. | 455/33.1 |
| 5,420,911 | 5/1995 | Dahlin et al. | 455/33.1 |
| 5,493,693 | 2/1996 | Tanaka et al. | 375/216 |
| 5,542,093 | 7/1996 | Bodin et al. | 455/33.2 |
| 5,551,073 | 8/1996 | Sammarco | 455/54.1 |
| 5,566,077 | 10/1996 | Obayashi et al. | 375/216 |
| 5,594,795 | 1/1997 | Dent et al. | 380/23 |

*Primary Examiner*—Salvatore Cangialosi
*Attorney, Agent, or Firm*—Banner & Witcoff, Ltd.

[57] ABSTRACT

When at a starting time of an apparatus with a power supply turned ON a designation operation of a communication mode is carried out or one communication operation is finished, a base station search control section (21) in a control circuit (20) conducts a search on control channels received from respective base station, selects from among those base stations whose control channels are received at an electric field strength greater than a predetermined level a base station possessing a desired communication mode and having the greatest electric field strength, and acquires and sets this base station, thus effecting a transfer to a standby state.

16 Claims, 9 Drawing Sheets

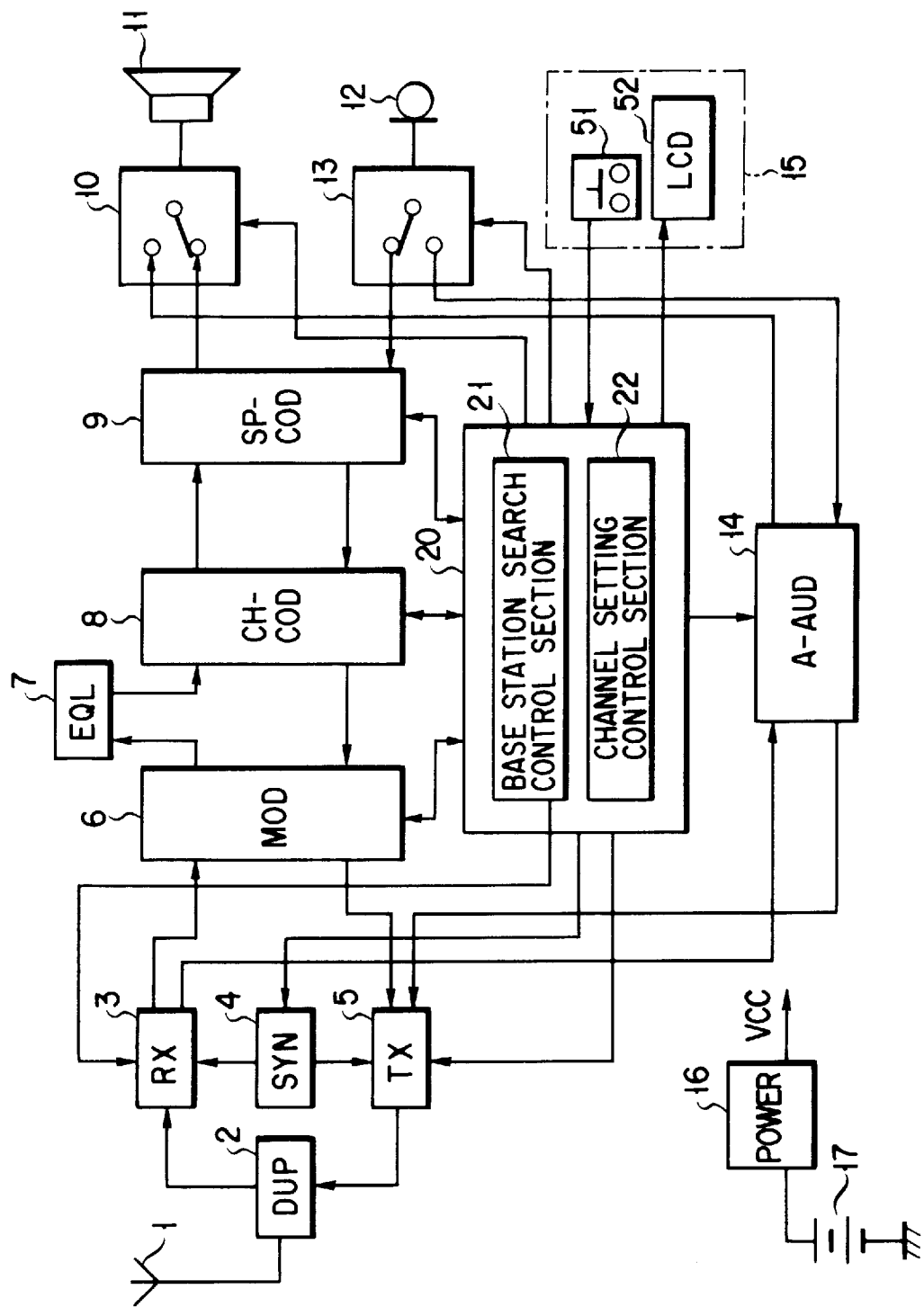
F I G. 2

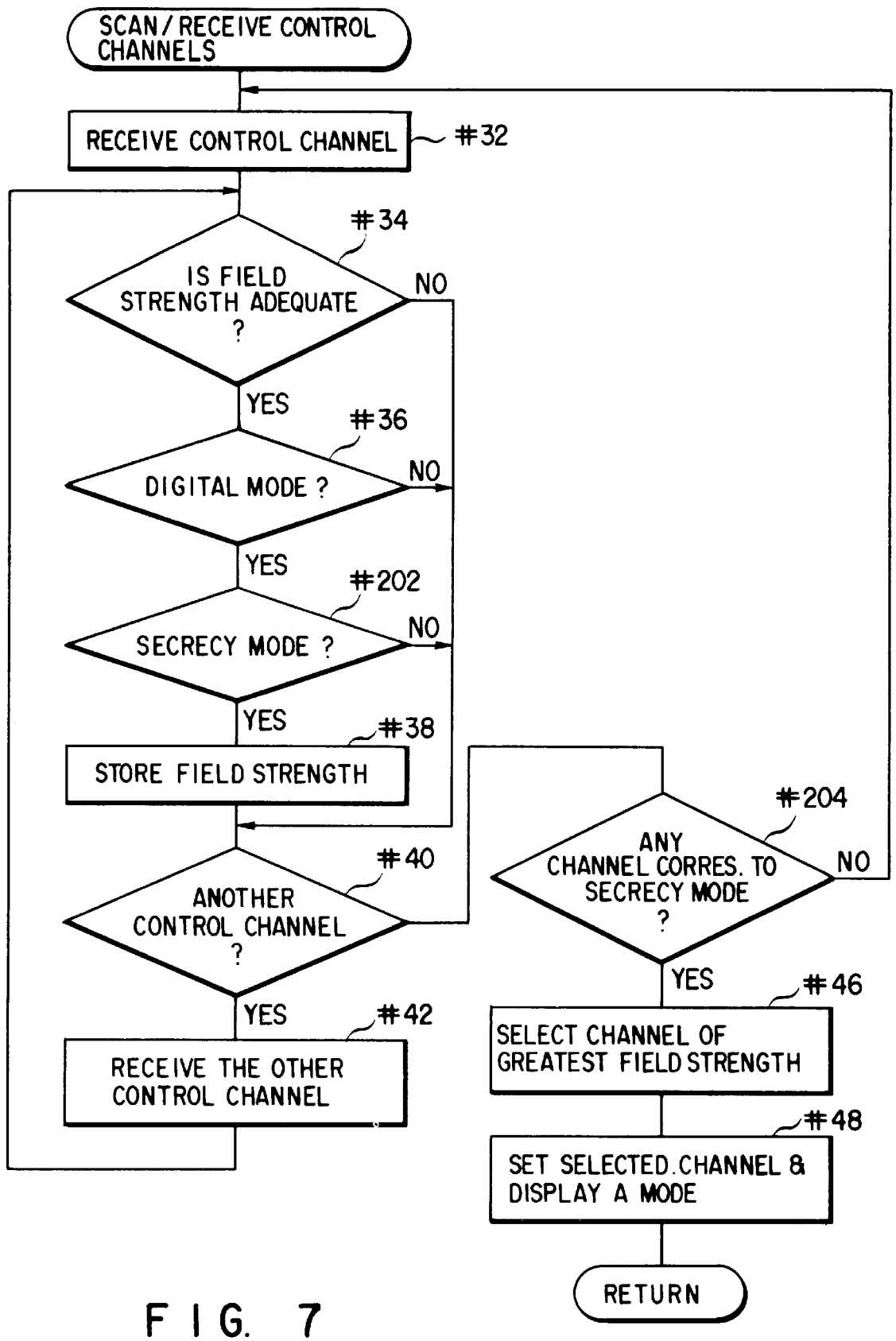
F I G. 7

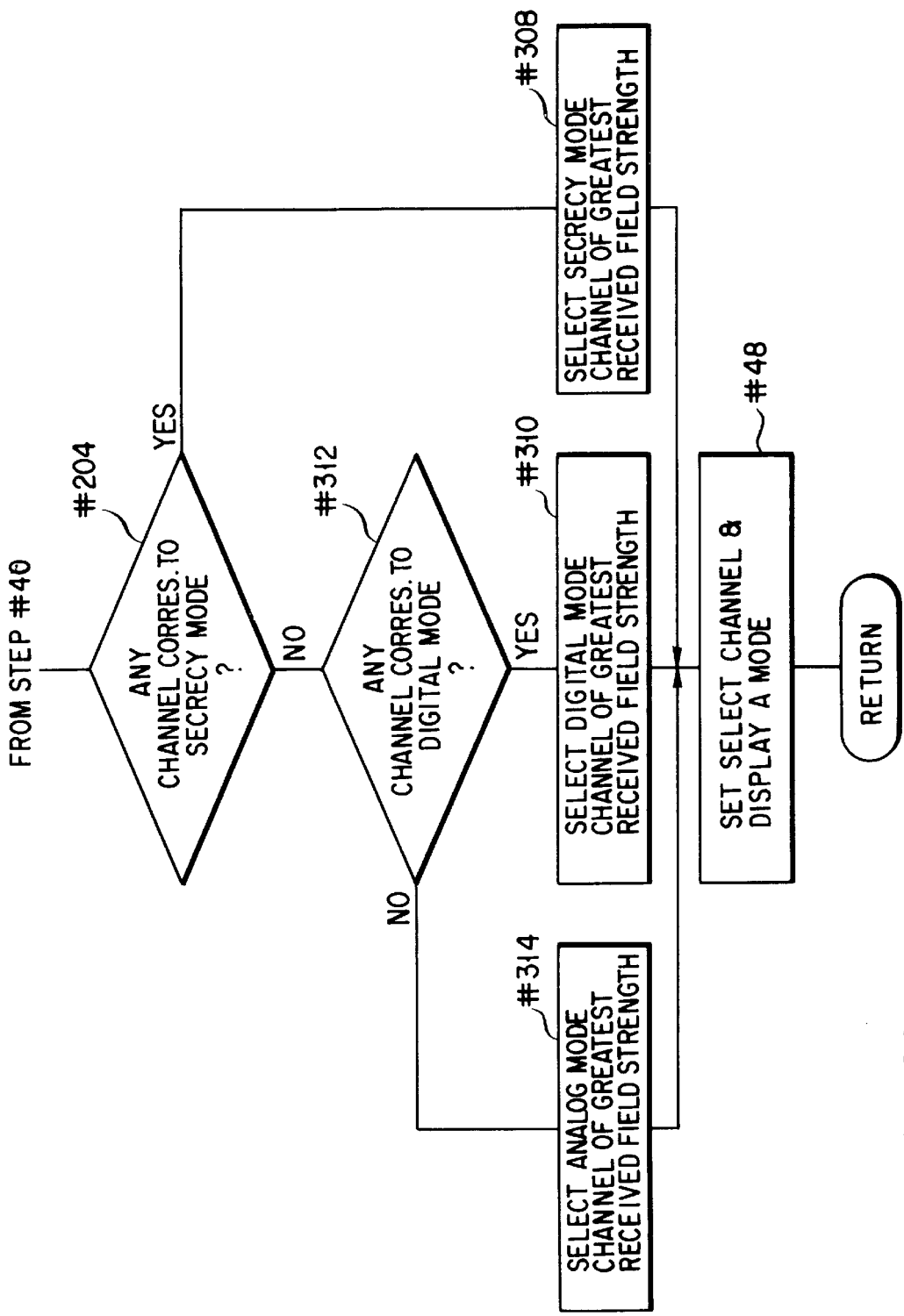
F I G. 8B

MOBILE RADIO COMMUNICATIONS APPARATUS

TECHNICAL ART

The present invention relates to a mobile radio communications apparatus, such as a land mobile radiotelephone, a hand-held telephone unit and a cordless telephone unit and, more in particular, to a mobile radio communications apparatus for use as a mobile unit in a cellular radio communications system adapted to wirelessly transmit a communication signal between a base station and the mobile unit.

BACKGROUND ART

A mobile radio communications apparatus adopting a dual mode system has been recently proposed in place of a mobile radio communications system adapted to wirelessly transmit a communication signal in a conventional analog system. Here, a dual mode is intended to mean an analog/digital combined mode.

The analog mode is of such a type as to transmit a speech signal and data through, for example, the FM modulation of a carrier with an analog speech signal and data at a transmitter and to receive a modulated carrier by a receiver coming from the transmitter and to reproduce an analog speech signal and data through FM demodulation. In the analog mode, a frequency-division multiple access (FDMA) system is used as an access system between the base station and the mobile unit.

A digital mode, on the other hand, is of such a type as to, through the encoding of a speech signal and data at a transmitter, transmit a carrier digitally modulated with an encoded signal, for example, in a π/4 shifted DQPSK (π/4 shifted, differentially encoded quadrator phase shift keying) system and to receive a demodulated signal by a receiver coming from the transmitter and reproduce a speech signal and data after the digital demodulation of the received data and decoding of a demodulated signal. In the digital mode, a time-division multiple access (TDMA) system is used in an access system between the base station and the mobile unit.

FIG. 1 is a view showing one practical example of this type of a system. This system includes a control station CS connected by a cable circuit line CL to a cable communications network NW, a plurality of (for example, three) base stations BS1, BS2 and BS3 connected by corresponding cable circuit lines CL1 to CL3 to the control station CS, and a great number of mobile units PS1, PS2, . . . . The base stations BS1, BS2 and BS3 create circular radio zones E1, E2 and E3 each of a predetermined radius. The mobile units PS1, PS2, . . . are connected to the base stations BS1, BS2 and BS3 of the radio zones E1, E2 and E3, via a radio speech communication channel, to which their own mobile units belong. As the radio speech communication channel, there are two types: an analog speech communication channel by the FDMA system and a digital radio communication channel by the TDMA system.

In the system as set out above, the connection of a radio link between the mobile unit and the base station is performed as set out below. With a power supply in an ON state, that is in a normal state, the base stations BS1, BS2 and BS3 broadcast control information to those mobile units in the respective radio zones via control channels called "paging channels". The control information contains information such as a service capacity possessed by the base station and the service capability contains information of a communication mode and so on.

At the time of turning on a power source and finishing communications, the mobile unit sequentially scans the control channels called "the paging channels" of the base units BS1, BS2 and BS3 and detects, out of these control channels, a control channel whose electric field strength received is the greatest. Thereafter, the mobile unit is set in a standby state in that control channel. When, in the standby state, a calling operation is made or a called signal is reached from the base station via the control channel, the mobile unit sends a calling signal to the base station via the control channel. At that time, if any desired communication mode is entered as a designated mode at the mobile unit, a request to set a communication mode is informed to the base unit in a form inserted into a control signal.

When the control signal is reached, the base unit detects any available radio communication channel corresponding to a requested communication mode in accordance with the communication mode setting request inserted into the control signal and informs it to the mobile unit. As a result, a communication link is established between the mobile unit and the base station over the radio communication channel and then the mobile unit user can exchange messages over the radio link.

In the system as set out above, the conventional mobile radio communications apparatus used as the mobile unit has the drawbacks to be improved.

As set out, upon the establishment of the radio link, the mobile unit, selecting the control channel of the base station, selectS the control channel of the greatest electric field strength received, at all times, and then the mobile unit user makes exchanges of a send/receive control signal to the base station over the control channel. That is, the mobile unit is connected at all times to a base station whose control channel involves the greatest received electric field strength. Even if, therefore, the mobile unit user requests any digital mode, a radio link will be unconditionally created in an analog radio call channel in the cases where the base station with the control channel of the greatest received electric field strength has an analog mode only and cannot handle a digital mode.

In this case, the mobile unit user will make a call message, without noticing the setting up of an analog radio call channel at all, as if a radio link were created in the digital radio call channel. Generally, the digital mode is multi-functional in comparison with the analog mode and any secrecy call, for example, by a scrambling scheme is only possible in the digital mode. For this reason there has been a risk that, if the user makes any call message, without noticing the setting up of the analog mode at all, as if the digital mode were created, an important message will leak out to any third party and, in addition, there is a fear that the user will not be aware of this fact.

The present invention has been achieved with the above in view and is directed to a mobile radio communications apparatus which, without being adversely affected by the level of an electric field strength, can select a control channel from a base station possessing a communication mode desired by a mobile unit user at a time of creating a radio link and can avoid a possible discrepancy between a communication mode desired by the user and a communication mode actually set by the base station and can make communications with the base station in a mode desired by the user.

DISCLOSURE OF INVENTION

According to one aspect of the present invention there is provided a mobile radio communications apparatus connected via a radio communication channel to a plurality of base stations each creating a predetermined radio zone, possessing at least one of a plurality of communication modes and transmitting a control signal representing a communication mode possessed thereby, comprising:

mode designating means for designating a desired communication mode;

means for receiving control signals from the plurality of stations at a starting time of communication and for determining the communication mode possessed by the respective base stations; and channel setting request means for making a communication channel setting request to any of those base stations possessing a desired communication mode when there exit such base stations.

According to another aspect of the present invention, there is a mobile radio communications apparatus connected via a radio communication channel to a plurality of base stations each creating a predetermined radio zone, possessing at least one of a plurality of communication modes and transmitting a control signal representing a communication mode possessed thereby, comprising:

mode designating means for designating a desired communication mode;

means for receiving control signals from the plurality of stations at a starting time of communication and for determining the communication mode possessed by the respective base stations; and channel setting request means for making a radio communication channel setting request to any of those base stations having received the control signal and possessing a desired communication mode when there are such base stations and for, in the absence of any base stations possessing the desired communication channel mode, making a radio communication channel setting request to any of the base stations.

According to the present invention, therefore, the mobile station in a site capable of receiving an electromagnetic wave from a plurality of base stations can select, from among these base stations, a base station possessing a communication mode desired thereby, that is, select a base station without being adversely affected by the levels of received electric fields of the control channels, and be placed in a standby state by the control channel from the selected base channel. That is, the selection of the base station is achieved not based on a receiving electric field strength priority of the control channel but based on a desiring communication mode priority.

If only there are, among base stations capable of receiving control channels, any base station or stations possessing a desired communication mode, the mobile unit user can positively select the base station and exchange communication in a communication mode. For this reason, there is a very small possibility of involving a discrepancy between the communication mode desired by the user and the communication mode actually set. It is, therefore, possible for the user to positively conduct communications in a desired communication mode.

BRIEF DESCRIPTION OF DRAWINGS

FIG. 2 is a block diagram showing an arrangement of a mobile radio communications apparatus according to a first embodiment of the present invention;

FIG. 7 is a flow chart showing a control procedure, and control contents, on the scanning of a control channel at a transmitting time on an apparatus according to a third embodiment of the present invention; and FIGS. 8A and 8B are a flow chart showing a control procedure, and control contents, on the scanning of a control channel at a receiving time on an apparatus according to a fourth embodiment of the present invention.

BEST MODE OF CARRYING OUT THE INVENTION

Figure 1:
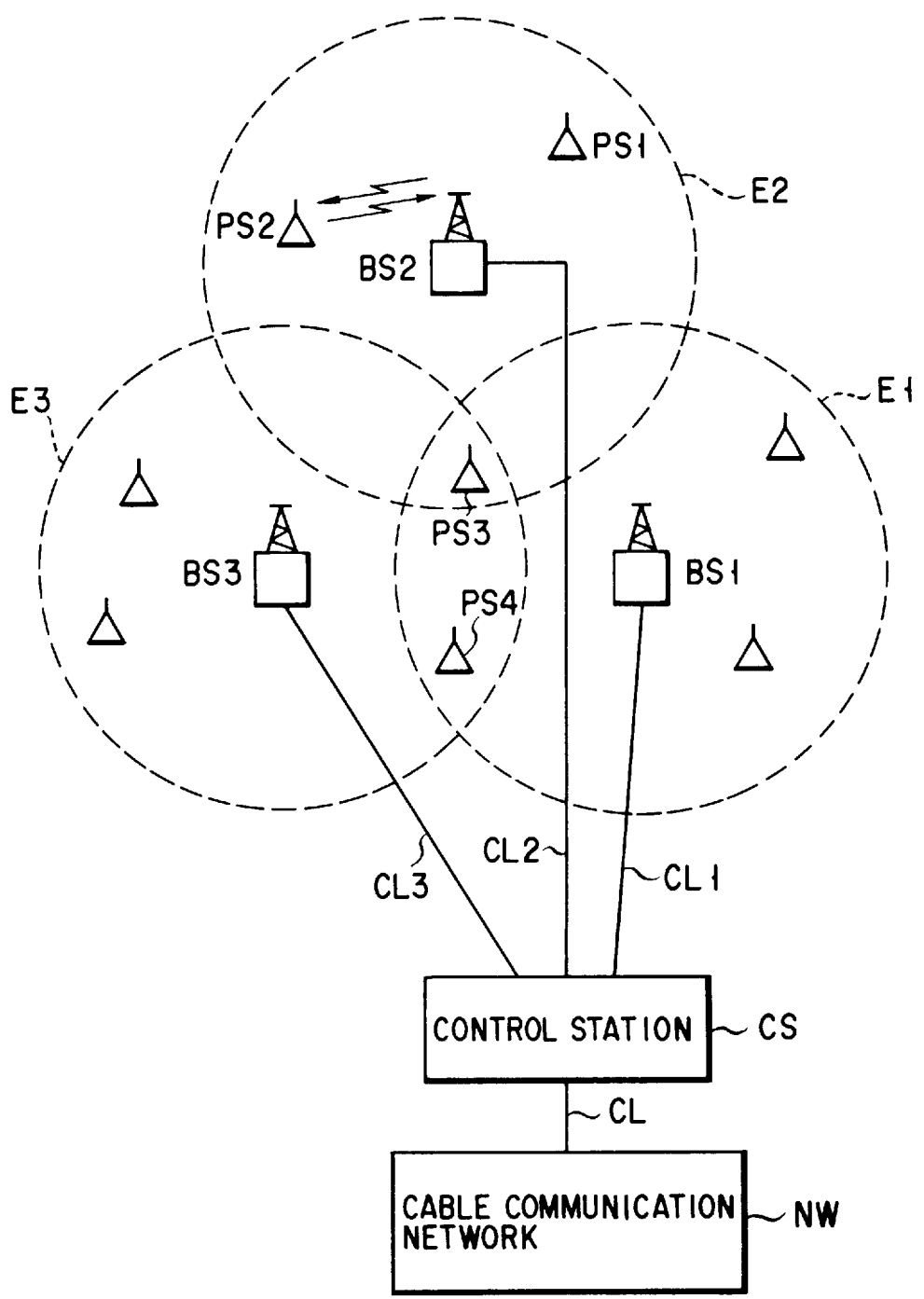
FIG. 1 is a diagrammatic view showing a dual mode type cellular radio telephone system.

The present invention will be explained below in more detail with reference to the accompanying drawings.

(First Embodiment)

FIG. 2 is a block diagram of a circuit having an arrangement of a dual mode type mobile radio communications apparatus according to a first embodiment of the present invention.

Changeover switches 10 and 13 are provided for mode switching and adapted to be switched in accordance with a switching instruction from a control circuit 20. The changeover switches 10 and 13 are connected to a speech encoding/decoding circuit (SP-COD) 9 side for a digital mode and to an analog speech processing circuit (A-AUD) for an analog mode.

A radio frequency signal sent from a base station, not shown, over a digital call channel or an analog call channel is received by an antenna 1 and input to a receiving circuit (RX) 3 via an antenna sharing unit (DUP) 2. According to the present invention, the antenna 1 can be used as either a receiving antenna or a transmitting antenna and functions as either of these antennas through the switching of the antenna sharing unit 2. At the receiving circuit 3, a received signal of a radio frequency is mixed with a local oscillation signal delivered from a frequency synthesizer (SYN) 4 and is frequency-converted to a received signal of an intermediate frequency. The frequency of the local oscillation signal generated from the frequency synthesizer 4 is controlled by a control signal delivered from the control circuit 20.

In the digital mode, the receiving circuit 3 supplies the received signal of an intermediate frequency to a digital modulation/demodulation circuit (MODEM) 6. In the analog mode, on the other hand, the receiving circuit 3 supplies the received signal of an intermediate frequency to the analog speech processing circuit 14.

The digital modulation/demodulation circuit 6 converts the received signal of an intermediate frequency to a digital signal and, after creating a frame-and a bit-synchronization, demodulates a digital baseband signal. Synchronized information obtained through the frame-and bit-synchronization is supplied to the control circuit 20.

The digital baseband signal demodulated by the digital modulation/demodulation circuit 6 contains a digital received signal and digital control signal. Of these signals, the digital control signal is supplied to the control circuit 20 and discriminated. The digital received signal is supplied to an equalizer (EQL) 7 and, being subjected to the signal equalization of a demodulated waveform, it is error correction decoded by the error correction encoding/decoding circuit (CH-COD) 8. The correction error decoded digital received signal is subjected by a speech encoding/decoding circuit (SP-COD) 9 to decode processing. In the case where, in the digital mode, any secrecy call communication is designated, that is, any digital secrecy communications mode is designated, the speech encoding/decoding circuit 9 performs, in addition to normal decode processing, descramble processing. An analog received signal is output from the speech encoding/decoding circuit 9 and supplied through the changeover switch 10 to a speaker 11 where a received speech is produced as a loud speech.

The received signal of an intermediate frequency entering the analog speech circuit 14, after being FM-demodulated, is speech-amplified. An analog received signal of a baseband is delivered from the analog speech circuit 14 through the changeover switch 10 to the speaker 11 where a received speech is output as a loud speech.

A speech signal of a user entering a microphone 12 is input, in the digital mode, to the speech encoding/decoding circuit 9 through the changeover switch 13 and, in the analog mode, to the analog speech circuit 14 through the changeover switch 13.

The speech encoding/decoding circuit 9 enables the speech signal to be subjected to digital encode processing. In the case where a digital secrecy speech mode is designated, the speech encoding/decoding circuit 9 performs, in addition to normal encode processing, scramble processing. A digital speech signal delivered from the speech encoding/decoding circuit 9 is sent, together with a digital control signal delivered from the control circuit 20, to the error correction encoding/decoding circuit 8 where error correction encode processing is performed on the digital speech signal and digital control signal. After being error correction encoded, the digital speech signal is input to the digital modulation/demodulation circuit 6. In the digital modulation/demodulation circuit 6, a modulated signal is generated as a π/4 shifted DQPSK modulated signal in accordance with the digital speech signal. The modulated signal is input to a transmitting (TX) circuit 5 after being converted to an analog signal by an A/D converter (not shown).

The speech signal input to the analog speech circuit 14 is FM modulated and the modulated signal is input to the transmitting circuit 5.

In the transmitting circuit 5, the input modulated signal is synthesized with a local oscillation signal corresponding to a radio frequency on the speech channel generated from the frequency synthesizer 4 and the synthesized signal, being converted to a transmitting signal of a radio frequency, is frequency amplified. The transmitting signal output from the transmitting circuit 5 is supplied via the antenna sharing unit 2 to the antenna 1 through which it is transmitted toward the base station (not shown).

The control circuit 20 is comprised of, for example, a microcomputer. An input display unit 15 is connected to the control circuit 20. The input display unit 15 includes an input key group 51 and display section 42. The input key group 41 has a dial key, transmitting key, finishing key and function keys such as a mode designation key. The mode designation key is used so as to allow designation inputting of any desired communication mode. As the communication mode allowing a designation by the mode designation key alone, there are, for example, an analog mode and digital mode. In the digital mode it is further possible to designate a secrecy call. The designation of the secrecy call is achieved by a mode designation key/dial key combination operation. Since the secrecy call can be regarded as one mode, it is possible, in the present invention, to set three modes, that is, an analog, a digital and a digital secrecy mode. The display section 52 is comprised of a light emitting diode (LED), a liquid crystal display device (LCD), etc. Here the display section is comprised of the liquid crystal display device.

A power supply circuit 16 generates a desired operation voltage Vcc on the basis of an output of a battery 17 and supplies it to an associated circuit or circuits.

The control circuit 20 performs normal control, such as the control of calling and called signals, of a hand-off of the base station involving the movement of a mobile unit and of a call and includes a mode input control section 23, base station search control section 21 and call channel setting section 22.

The mode input control section 23 monitors, at a standby time, an operation by a mode designation key and a mode designation input operation by the mode designation key and dial key and, in the case where the designation operation of the communication mode is effected, stores the communication mode.

The base station search control section 21 scans the control channels of respective base stations when the power supply is turned on (the device is started), the designation operation of the communication mode is effected, and the communication is finished. Of these base stations receiving the control information by scanning, a search is made for a base station having a communication mode designated by a caller and having a control channel of the greatest received electric field strength. With the control channel of the base station in a set-up state, a transfer is made to a standby state. The base station search control section 21 allows a communication mode which is possessed by the selected base station to be displayed on the LCD 52.

In the case where a calling operation is effected by the input key group or a called signal reaches a party through the set control channel, the communication channel setting control section 22 sends, to the base station through the control channel, a request to set a corresponding communication mode initially stored in the mode input control section 23. In response to the setting request, the control section allows a radio call channel to be set in accordance with an instruction coming from the base station over the radio call channel.

The operation of the first embodiment thus arranged will be explained below in accordance with a control procedure of the control circuit 20.

Figure 3:
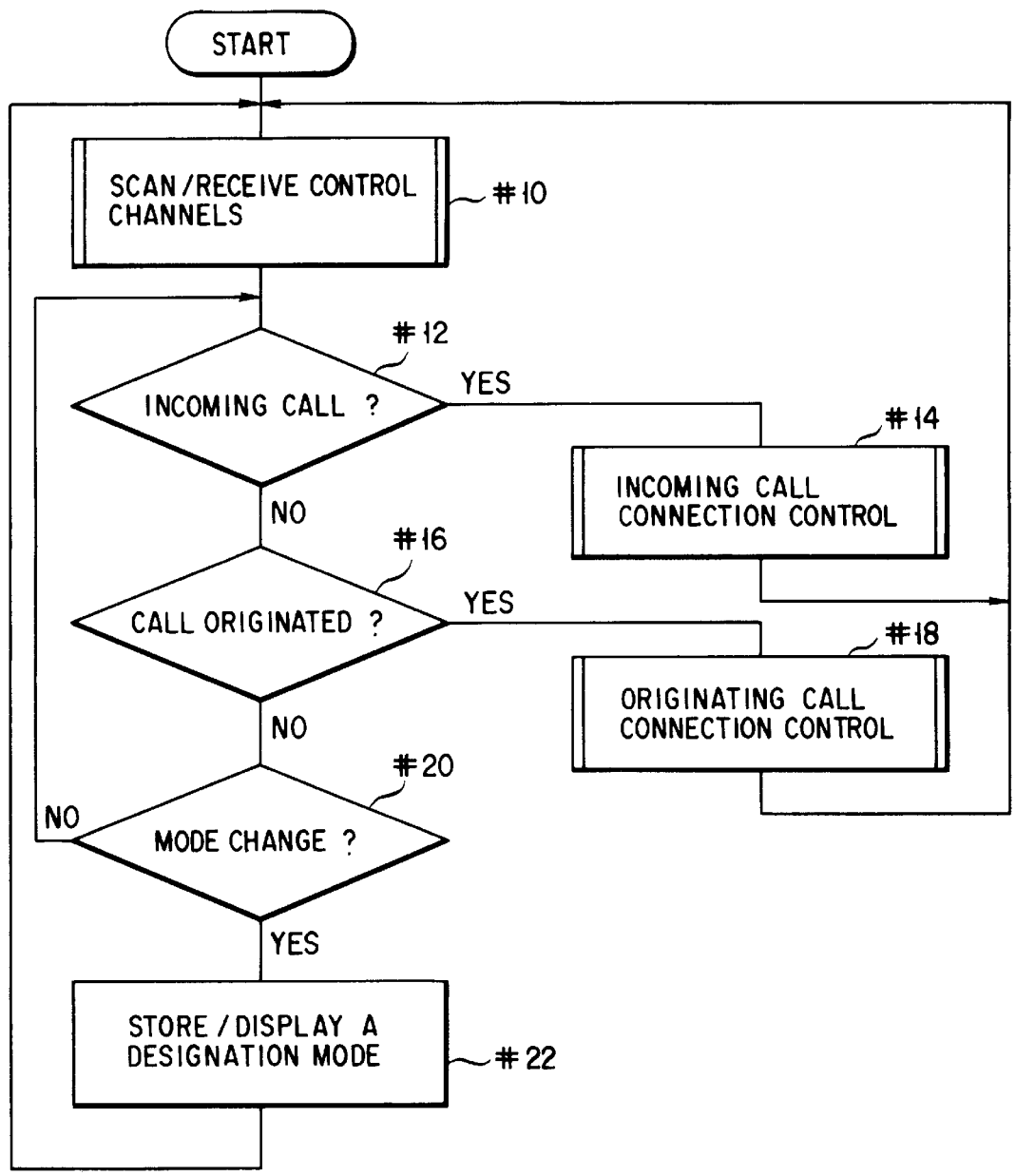
FIG. 3 is a flow chart showing a control procedure, and control contents, on a standby state including the scanning of a control channel at a receiving time performed by a control circuit of the apparatus shown in FIG. 2.
Figure 4:
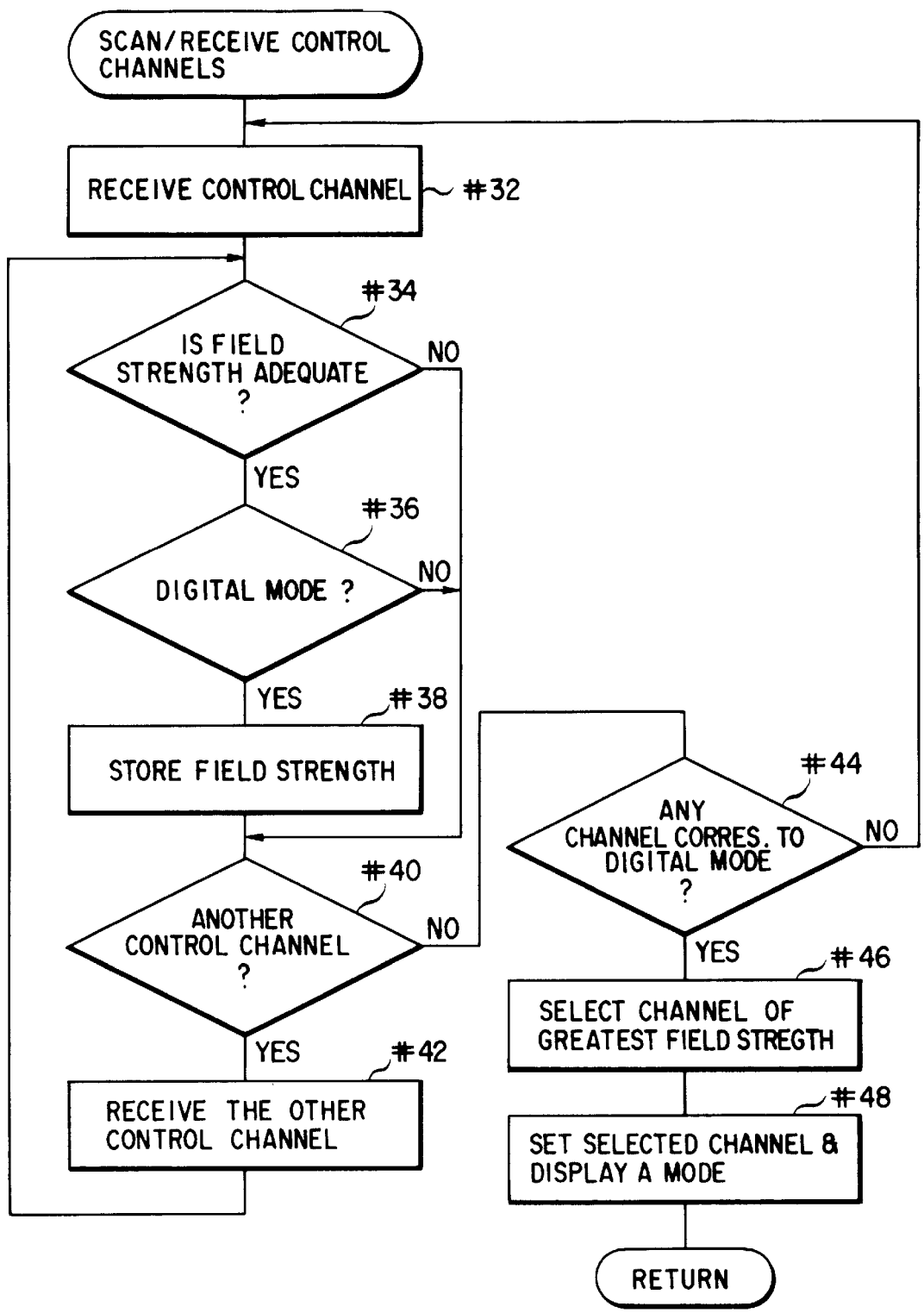
FIG. 4 is a flow chart showing a control procedure, and control contents, on the scanning of a control channel at a receiving time performed by the control circuit of the apparatus shown in FIG. 2.

With the power supply of the apparatus in a turned-off state, a control channel search routine is executed as shown in FIG. 3. First, at a receiving time, scanning is effected on those control channels called paging channels at step #10. The detail of this event is as shown in FIG. 4.

Of those control channels called the paging channels possessed by respective base stations, one is received by selection at a step #32 and it is determined at step #34 whether or not a received electric field strength on this control channel is greater than a minimal electric field strength at which a call can be made. If the received electric field strength is not greater than the minimal electric field, it is determined at step #40 whether or not there is any extra control channel not yet received. If there is another control channel not yet received, this channel is received, through selection, at a step #42. Then control is returned back to step

34 and it is determined whether or not the received electric field strength on the control channel is greater than the minimal strength.

In the case where any control channel on which a received electric field strength is greater than a predetermined strength is found through the search of control channels at step #34, it is determined on the basis of control information sent from the base station over a control channel, whether or not the base station possesses any communication mode, which the mobile unit user desires. Here an explanation will be given of the case where the communication mode is a digital mode. That is, it is determined at step #36 whether or not the base station possesses a digital mode.

In the case where it is determined that at step #36 the base station possesses a digital mode, the received electric field value on the control channel of the base station is written in a RAM in the control circuit 20 at step #38. In the case where it is determined that the base station has no digital mode, it is determined at step #40 whether or not there is another control channel not yet received.

When the search is completed on the receiving of the control channels at all the base stations, that is, it is determined that there are no other control channels yet to be received at step #40, it is determined at step #44 whether or not there is any control channel at the base station possessing a digital mode among those control channels received by the search. If it is determined that there are control channels from the base stations possessing the digital modes, step #46 selects the control channel corresponding to a maximal value of the received electric field strengths stored in the RAM in the control circuit 20 and step #48 acquires the selected control channel. In practice, the frequency of a local oscillation signal generated from the frequency synthesizer 4 is set in accordance with the control channel. At step #48, a display pattern representing a communication mode possessed by the base station whose control channel is selected is displayed on the LCD 52, that is, "A" on the LCD 52 for the analog mode and "D" on the LCD for the digital mode.

In the case where a secrecy call is designated in the digital mode, "S" is displayed.

In the case where it is determined at step #44 that there is, of those control channels received upon search, no control channel from the base stations possessing a digital mode, control is returned back to step #32 for the execution of the control channel search routine and one is selected and received from among those control channels called paging channels possessed by respective base stations.

In this way, at the start of the apparatus, that is, at the turning ON of a power supply, the control channel is acquired and set. Then the apparatus is placed in a standby state for the control channel.

The standby state means steps #12 and #16 in the flow chart in FIG. 3. It is determined at step #12 whether or not a called signal is reached and it is determined at step #16 whether or not a calling signal is sent. If there is neither a called signal nor a calling signal, it is determined at step #20 whether or not a mode designation key is operated. In the case where the mode designation key is not operated, control is immediately returned back to steps #12 and #16 for a standby state. In the case where the mode designation key is operated, a communication mode entered by the mode designation key is written in the RAM in the control circuit 20. Further, the display pattern of the communication mode entered is displayed on the LCD 52.

If the operation of a change is made for a desired communication mode in this way, then control is returned back to step #10, the scanning of the control channels is restarted upon the receiving of the control channels as shown in more detail and selection is made of a control channel of a base station possessing a communication mode newly designated.

In the case where a called signal is received in the standby state, called circuit connection control is made in the standby state. If a calling operation is made, calling circuit line connection control is made at step #18.

Figure 5:
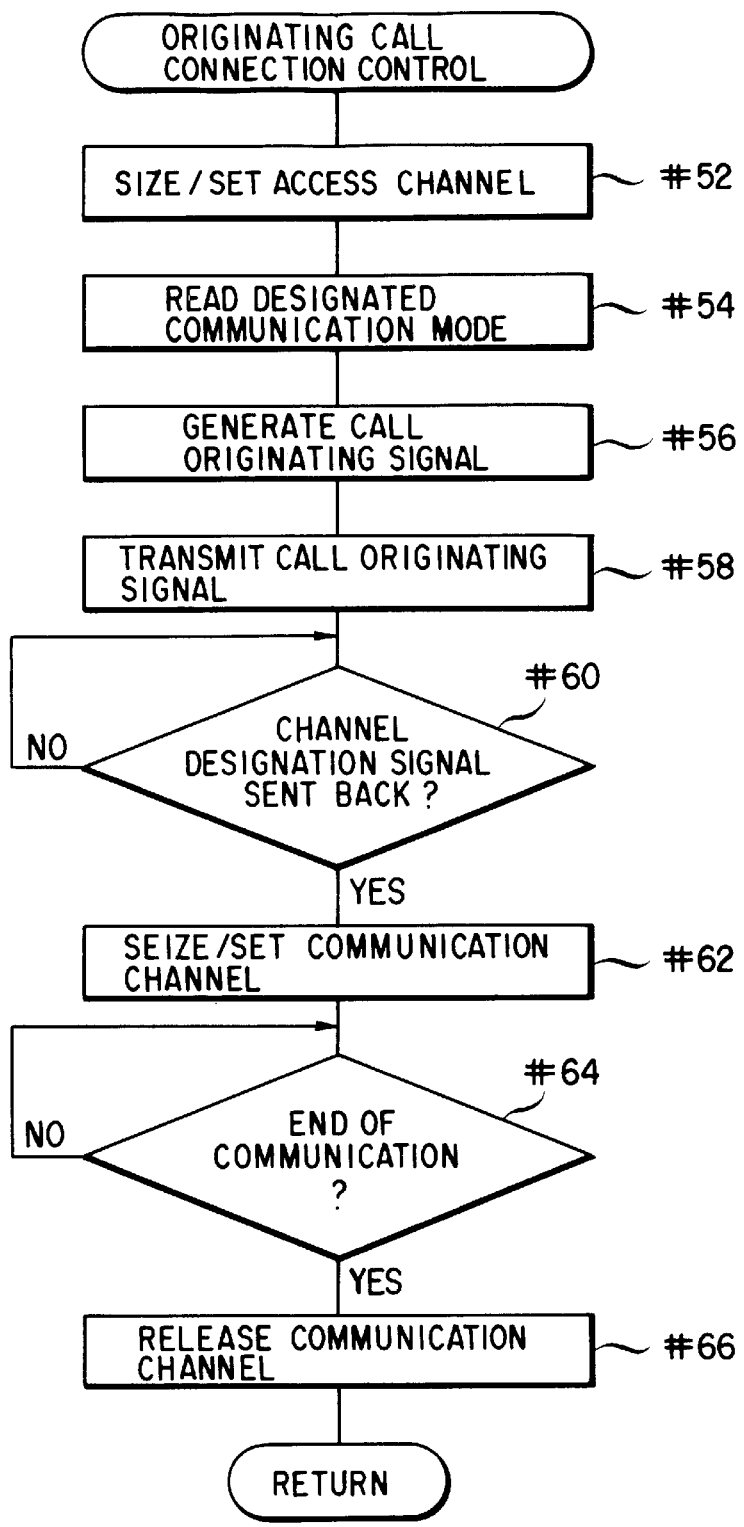
FIG. 5 is a flow chart showing a control procedure, and control contents, on a circuit line control at a transmitting time performed by the control circuit of the apparatus shown in FIG. 2.

FIG. 5 shows a detail of the calling circuit line connection control. First, step #52 acquires and sets a control channel called an access channel, step #54 reads out a desired communication mode from the RAM in the control circuit 20, step #56 prepares a calling signal (a call request signal) containing information representing a desired communication mode (digital mode) and step #58 transmits the prepared call request signal to the base station.

After the transmission of the calling signal, a standby state stays until a channel designation signal is sent back from the base station. If the channel designation signal is sent back from the base station, step #62 acquires and sets a corresponding radio call channel in accordance with a call channel designation information inserted in the channel designation signal. A call message is made in accordance with the designated mode.

The completion of the call message is made at step #64, the radio call channel is released at step #66 and scanning is effected through the receiving of the control channels.

It is to be noted that the called signal circuit line connection control is the same in the flow chart of the calling signal circuit line connection control in FIG. 5 except that at step #56 a called signal answering signal is prepared in place of a calling signal and at step #58 a called signal answering signal is transmitted in place of transmitting a calling signal. Therefore, any further explanation is omitted.

According to the present invention, as set out above, at the time of turning on the power supply, effecting a communication mode designation operation and completing one communication, a search is effected through the receiving of control channels from respective base stations by the base station search control section 21 in the control circuit 20; from among those base stations on the control channels received through the search which have a received electric field strength greater than a predetermined level, a station is selected possessing a desired communication mode and a greatest received electric field strength; and the control channel at that base station is acquired and set, thus effecting a transfer to a standby state. In the mobile units, such as PS3 and PS4 in FIG. 1, for example, in those sites where an electromagnetic wave can be received from a plurality of base stations, first, base stations are selected from among the plurality of base stations where control channels can be received, that is, base stations are selected possessing a user's desired communication mode not depending upon a received electric field strength level alone, and then from among these base stations a base station whose received electric field strength is the greatest is acquired and set, thus effecting a transfer to a standby state. In comparison with a conventional apparatus which has selected a base station at all times on the control channel of the greatest received electric field strength without considering any desired communication mode, there is a high probability that communication will be carried out in a communication mode desired by the mobile unit user. This reduces an incidence of a discrepancy between a desired communication mode and an actually set communication mode and can eliminate any inconvenience which might otherwise be caused to the user in a not-desired mode.

Further, since information representing a communication mode possessed by the base station selected through the search of the control channels at a receiving time is displayed on the LCD 52, the user can confirm a selectable communication mode in the standby state. In the case where, for example, the mobile unit user is in a service area of a base station where an analog mode only can be used, a proper action can be taken, such as an important call message of high secrecy can be avoided at that user area or the mobile unit can be moved into the service area of another base station.

Another embodiment of the present invention will be explained below. In this embodiment, the same references are employed to designate parts or elements corresponding to those shown in the first embodiment. For example, where parts or sections of the present embodiment are the same in arrangement as those of the first embodiment, an explanation of the block diagram portion is omitted and an operation of it alone will be explained below.

(Second Embodiment)

In the scanning of control channels at a receiving time, the present embodiment detects not only those base stations possessing a desired communication mode but also those base stations not possessing any desired communication mode and, in the case where it is not possible to receive any control channel from the base station possessing the desired communication mode, the control channel from the base station not possessing the desired communication mode is acquired and set, thus effecting a transfer to a standby state.

Figure 6:
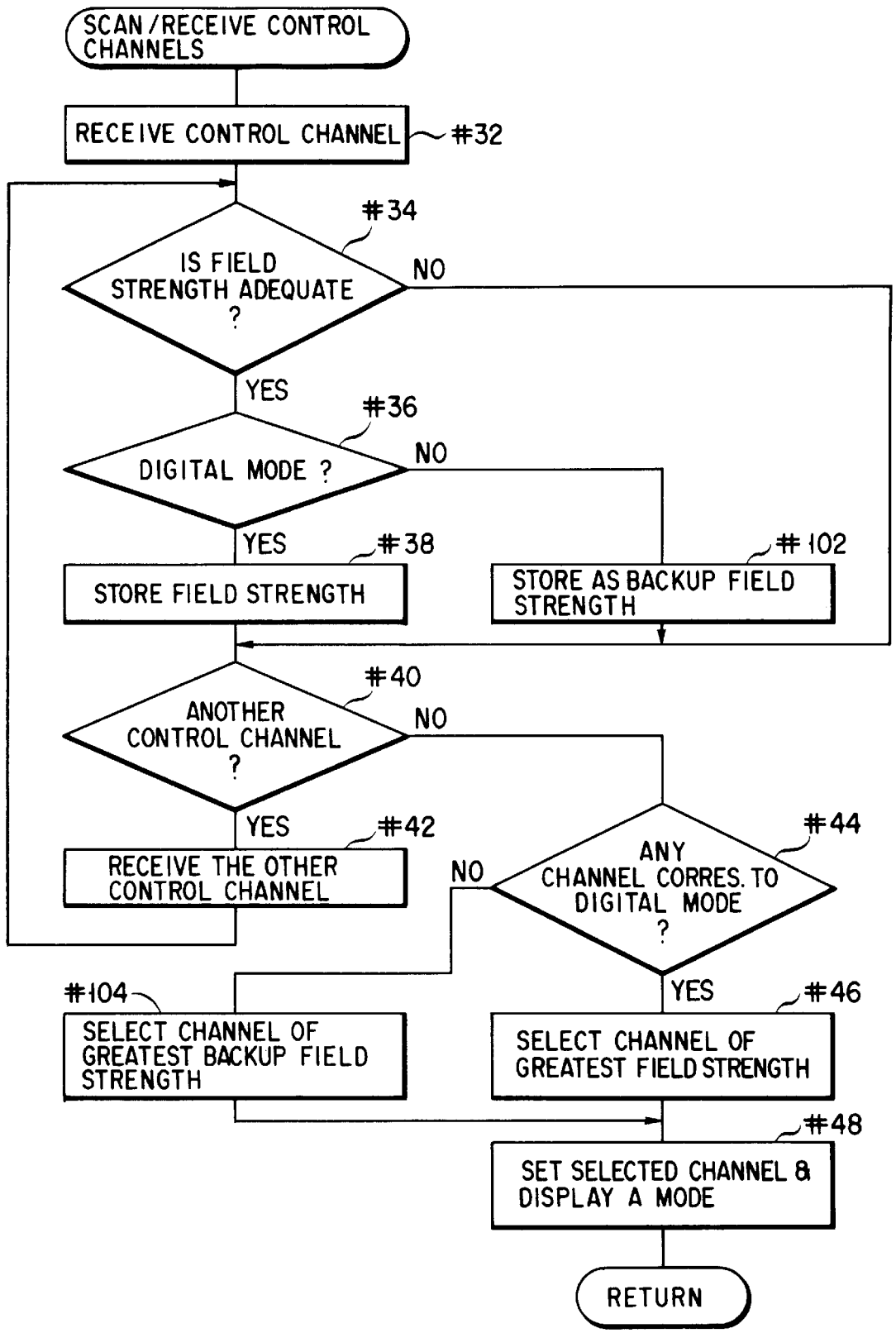
FIG. 6 is a flow chart showing a control procedure, and control contents, on the scanning of the control channel at a receiving time on a second embodiment of the present invention.

FIG. 6 is a flow chart showing a control procedure, as well as its control contents, on the scanning of control channels at a receiving time on a mobile radio communications apparatus of the present invention. In this connection it is to be noted that a detailed explanation is omitted with the same references employed to designate parts or elements corresponding to those shown in FIG. 4.

When it is determined at step #36 that the base station on received control channels has no digital mode, an electric field value of the received control channels from the base stations is written as a backup electric field value into a RAM of the control circuit 20 at a step #102. Then it is determined at step #40 whether or not there are any other control channels not yet received. That is, according to the second embodiment, those electric field strengths of control channels having strengths above a predetermined value are stored in two groups: one for those stations having a digital mode and the other for those stations having no digital mode.

In the case where, subsequent to the completion of a search of control channels from all the base stations at the receiving time, step #44 determines that, among the control channels received through the search, there exist no control channels from the base stations possessing a digital mode, step #104 selects a control channel corresponding to a maximal value of the backup received electric field strength stored in the RAM of the control circuit, that is, a control channel from the base station possessing an analog mode and step #48 acquires the selected channel, effecting a transfer to a standby state.

According to the present embodiment, if, of those control channels received, there exist no control channels from the base stations possessing any desired communication mode, then in place of repeating the scanning of the control channels to be received as in the first embodiment, selection is made of a base station possessing no desired communication mode, effecting a transfer to a standby state. Even if, therefore, it is not possible to select the base station possessing a desired communication mode, it is possible to put the mobile unit in a state in which communication can be made. Since, in this case, the communication mode the selected base station possesses is displayed on the LCD 52, the user can know, from this display, that it is not possible to make communication in a desired mode. This eliminates any inconvenience in the user resulting from a discrepancy between a mode desired and the mode actually set.

(Third Embodiment)

According to this embodiment, if the user designates a digital secrecy mode through the scanning of control channels at a receiving time in the case where base stations possess, as a communication mode, an analog mode, digital mode and digital secrecy mode, the user can select the base station possessing the digital secrecy mode, effecting a transfer to a standby state.

FIG. 7 is a flow chart showing a control procedure, as well as its control contents, for the scanning of control channels at a receiving time on a mobile radio communications apparatus of the third embodiment. In the flow chart shown, the same reference numerals are employed to designate steps corresponding to those in FIG. 4 and any further explanation is, therefore, omitted.

If step #34 detects control channels possessing electric field strengths of above a predetermined level at a receiving time and step #36 determines that the base stations on the control channels possess a digital mode, then it is determined at step #202 whether or not the base stations have a digital secrecy mode. When it is determined that they have a digital secrecy mode, those electric field strengths of the control channels received at step #38 are stored in a RAM in the control circuit 20.

When the search of the control channels from all the base stations at the receiving time is completed, it is determined at step #204 whether or not, among those control channels received through the search, there exist control channels from the base stations possessing a digital secrecy mode. It is determined at step #204 that the control channels from the base stations having the digital secrecy mode has been received. step #46 selects a control channel of the greatest received electric field strengths from the control channels corresponding to the digital secrecy mode stored in the RAM and step #48 acquires and sets this control channel, effecting a transfer to a standby state. Even in this embodiment, the communication mode the base station from the set control channel possesses is displayed on the LCD 52.

According to the present embodiment, if the mobile unit user desires a digital secrecy mode, the mobile unit selects through the scanning of the control channels at a receiving time, a control channel from the base station possessing the digital secrecy mode and acquires and sets it. Therefore, there is a high probability that the mobile unit user will make a call message in a digital secrecy mode. This provides a great advantage in conducting an important exchange of call messages.

(Fourth Embodiment)

Through the scanning of control channels at a receiving time, the embodiment enables electric field strengths of all those received control channels to be stored. In the case where those control channels from base stations possessing a digital secrecy mode corresponding to a first desired mode are received, it is possible to select, out of the control channels, a control channel of the greatest received electric field value and set it. In the case where it is not possible to receive control channels from base stations possessing a digital secrecy mode but it is possible to receive control channels from the base stations possessing a digital mode corresponding to a second desired mode, then it is possible to select, from the control channels, a control channel of the greatest received electric field values and set it. Further, in the case where it is possible to receive control channels from the base stations possessing an analog mode only, then it is possible to select, from the control channels, a control channel of the greatest received electric field and set it.

Figure 8A:
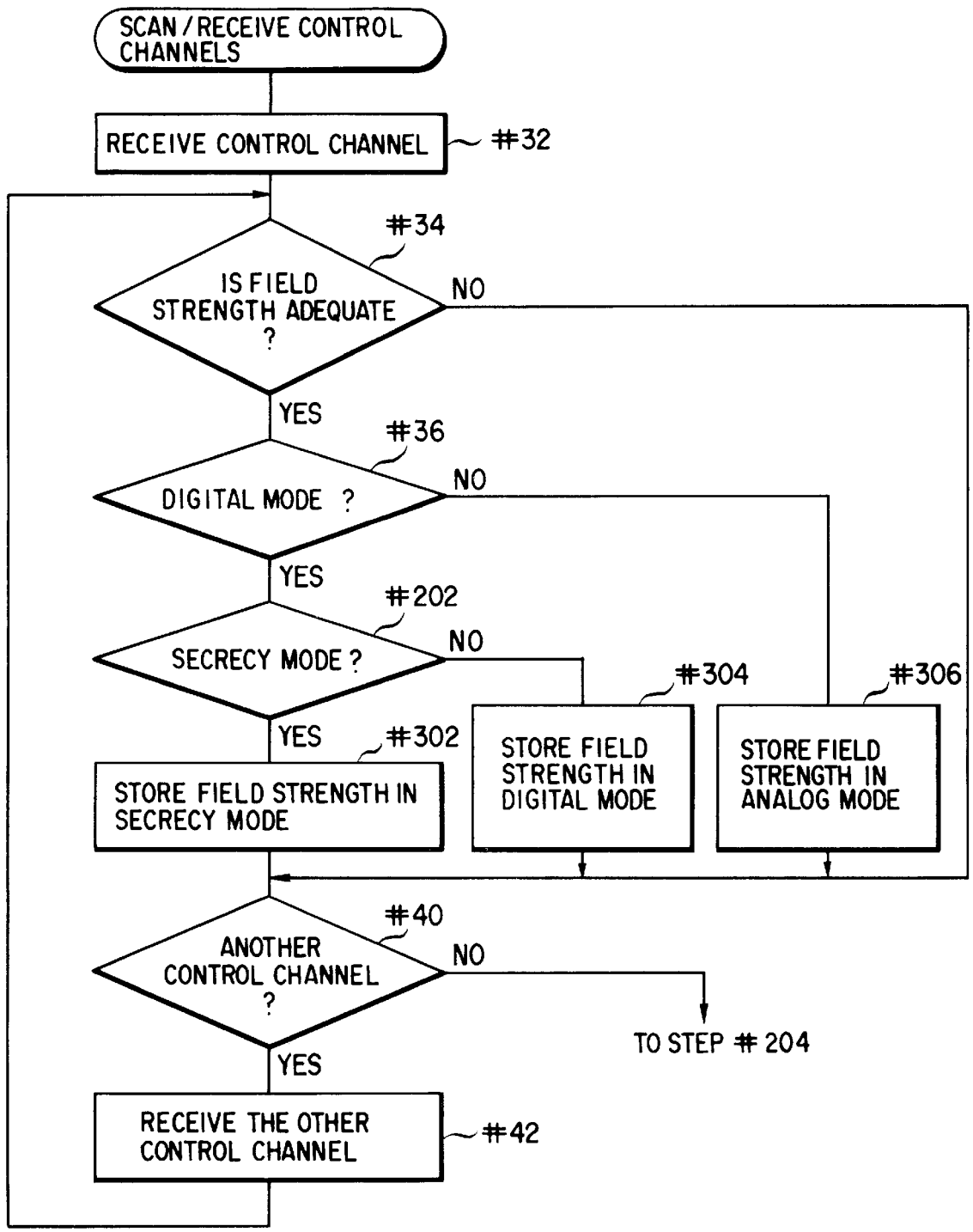

FIGS. 8A and 8B show a flow chart showing a control procedure, as well as its control contents, on the scanning of received control channels on a mobile radio communications apparatus of the present embodiment. In the flow chart shown, the same reference numerals are employed to designate steps corresponding to those in FIGS. 4 and 7 and any further explanation is omitted.

In the case where step #34 detects control channels of above a predetermined received electric field strength and step #36 determines that base stations on the control channels possess a digital mode and step #202 determines that they possess a digital secrecy mode, then step #302 stores the received electric field strengths of the control channels from the base stations in the RAM with attributes of the secrecy mode attached thereto. In the case where step #202 determines that the base stations possess no secrecy mode, step #304 stores the received electric field strengths of the control channels from the base stations in the RAM with attributes of the digital mode attached thereto. In the case where step #36 determines that the base stations possess no digital mode, step #306 stores the received electric field strengths of the control channels from the base stations in the RAM with attributes of an analog mode attached thereto.

When the search of control channels from all the base stations at a receiving time is completed, it is determined at step #204 whether or not, among those control channels received through the search, there are control channels from the base stations possessing a digital secrecy mode. If it is determined at step #20 that the control channels from the base stations possessing the digital secrecy mode are received, step #308 selects a control channel of the greatest received electric field from the control channels corresponding to the digital secrecy mode. At step #48, this control channel is acquired and set and a selected mode is displayed on the LCD 52. Thereafter, a transfer is effected to a standby state.

If it is judged at step $204 that it is not possible to receive the control channel from the base station possessing the digital secrecy mode, it is determined at step #312 whether or not, among the control channels received through the search at the receiving time, there are control channels from the base stations possessing the digital mode. If it is determined at step #312 that it is possible to receive control channels from the stations possessing the digital mode, then step #310 selects a control channel of the greatest received electric field strength from the control channels corresponding to the digital mode stored in the RAM and step #48 acquires and sets this control channel and the selected mode is displayed on the LCD 52, effecting a transfer to a standby state.

If it is determined at step #312 that it is not possible to receive the control channels at the base stations possessing the digital mode, then step #314 selects, from among the control channels corresponding to an analog mode stored in the RAM, a control channel of the greatest received electric field strength and step #48 acquires and sets the control channel and the selected mode is displayed on the LCD 52, effecting a transfer to a standby state.

According to the present embodiment, in the case where it is not possible to receive, from among the received control channels, a control channel from the base station possessing a digital secrecy mode corresponding to a first desired mode, then a base station can be selected in a digital mode corresponding to a second desired mode, thus effecting a transfer to a standby state. Further, even if it is not possible to receive control channels from the base stations possessing the digital mode, it is possible to select a base station in the analog mode and effect a transfer to a standby state. That is, it is possible to select a base station in a different communication mode in accordance with a priority level desired.

The present invention is not restricted to the above-mentioned embodiments and various changes or modifications of the invention can be made. In the case where, for example, the user cannot select any base station possessing his of her desired communication mode and has to select a base station possessing another communication mode, it may be possible to arouse specific attention in him or her by, for example, flashing the display area on and off instead of simply displaying, in a character pattern, the communication mode possessed by the selected base station. Further, it may also be possible to, without the need to flash a mode display on and off at all times, flash a display area on and off only in the case where a radio link is established at a calling time or at a called time. When a call message is exchanged in a mode other than a desired mode, it may be possible to produce an alarm sound or produce a synthesized sound, as a loud sound, indicating that the set mode is different from the desired mode. Regarding other things, such as the types of the system and their arrangement, circuit arrangement of the apparatus, control procedure on the retrieval control from the base stations and its control contents, and control procedure on the radio channel establishment and its control contents, various changes or modifications of the present invention can be made without departing from the spirit or scope of the present invention.

INDUSTRIAL APPLICATION

According to the present invention, as set out above, in a mobile unit site where it can receive electromagnetic waves from a plurality of base stations, a mobile unit user selects a base station possessing his or her desired communication mode out of these base stations without being adversely effected by a received electric field strength level of that control channel, thus being put in a standby state through the control channel from the base station. That is, the selection of the base station is effected not on a control channel receiving electric field strength priority basis but on a desired communication mode priority basis. If only any base station possessing a desired communication mode is present among base stations where control channels can be received, the mobile unit user can select the base station positively and conduct an exchange of call messages in a desired communication mode. Therefore, the mobile unit user has much less chance of using a different communication mode from his or her desired communication mode and can positively exchange a call message in his or her desired communication mode.

According to the present invention, if some base station possesses a secrecy mode as one digital mode and the mobile unit user wants this secrecy mode, then the user can select the base station possessing the secrecy mode even in the case where there are other base stations whose received electric field strengths are greater than that of the base station possessing the secrecy mode. It is, therefore, possible to make an exchange of call messages in a secrecy level.

Further, in the case where there is, among those base stations receiving control information, no single base station possessing a desired communication mode, it is possible according to the present invention to select a base station possessing no desired communication control. Even in the case where a mobile unit site is outside a range in which the mobile unit cannot receive an electromagnetic wave from a base station possessing a desired communication mode, the mobile unit can be put in a practically available lowest state of communication.

According to the present invention, since it is possible to display a communication mode possessed by the base station, that is, the base station selected by the retrieval of the control channels, the mobile unit user in the standby state can clearly identify a current available communication mode on the display section. If, therefore, the mobile unit is at a site where communication cannot be effected in a wanted communication mode, a proper action can be taken so that the mobile unit can be moved into a service area of those base stations possessing a wanted communication mode. It is thus possible according to the present invention to ensure a high service level of communication.

According to the present invention, therefore, a mobile radio communications apparatus can be provided which enables the mobile unit to establish a radio link to a base station possessing a desired communication mode and the mobile unit user to exchange call messages in his or her desired communication mode without any practical discrepancy from a communication mode actually set.

We claim:

1. A mobile radio communications apparatus connectable via radio communication channels to base stations each using an associated transmission/reception format, comprising:

a format designating circuit for designating a particular one of a plurality of transmission/reception formats;

a detector, which receives control signals from said base stations, for detecting the transmission/reception format used by at least one of said base stations; and a channel setting request circuit for making a communication channel setting request to one of said base stations which is using the same transmission/reception format as the transmission/reception format designated by said format designating circuit.

2. The mobile radio communications apparatus according to claim 1, wherein the transmission/reception formats include an analog format in which an analog radio communication channel is used, a digital format in which a digital radio communication channel is used, and a digital secrecy format in which scrambled communication signals are transmitted over a digital radio communication channel.

3. The mobile radio communications apparatus according to claim 1, wherein said detector detects a level of the control signals received from those of said base stations which are using the same transmission/reception format as the transmission/reception format designated by said format designating circuit and said channel setting request circuit sends the communication request to the base station transmitting the control signal whose received level is the greatest among those base stations which are using the same transmission/reception format as the transmission/reception format designated by said format designating circuit.

4. The mobile radio communication apparatus according to claim 1, further comprising a display for displaying an indicator of the transmission/reception format of that base station to which the communication channel setting request is made by said channel setting request circuit.

5. A mobile radio communications apparatus connected via radio communication channels to base stations each using an associated transmission/reception format, comprising:

a format designating circuit for designating a particular one of a plurality of transmission/reception formats;

a detector, which receives control signals from said base stations, for detecting the transmission/reception format of at least one of said base stations; and a channel setting request circuit for making a radio communication channel setting request to one of those base stations which uses the same transmission/reception format as the transmission/reception format designated by said format designating circuit when there are such base stations and for, in the absence of any base stations using the same transmission/reception format as the transmission/reception format designated by said format designating circuit, making a radio communication channel setting request to any of said base stations.

6. The mobile radio communications apparatus according to claim 5, wherein the transmission/reception formats include an analog format in which an analog radio communication channel is used, a digital format in which a digital radio communication channel is used, and a digital secrecy format in which a scrambled signal is transmitted over a digital radio communication channel.

7. The mobile radio communications apparatus according to claim 5, wherein said detector detects a level of the control signals received from those base stations using the same transmission/reception format as the transmission/reception format designated by said format designating circuit and said channel setting request circuit sends the radio communication channel setting request to the base station transmitting the control signal whose received level is greatest among those base stations using the same transmission/reception format as the transmission/reception format designated by said format designating circuit.

8. The mobile radio communications apparatus according to claim 5, further comprising a display for displaying an indicator of the transmission/reception format of that base station to which the communication channel setting request is made by said channel setting request means.

9. The mobile radio communications apparatus according to claim 6, wherein said channel setting request circuit is adapted to, when the transmission/reception format designated by said format designating circuit is the digital secrecy format and there are base stations using the digital secrecy format, make a radio communication channel setting request to any of said base stations using the digital secrecy format and display an indicator of the digital secrecy format, when, in the absence of base stations using the digital secrecy format, there are base stations using a digital format, make a radio communication channel setting request to any of said base stations using the digital format and display an indicator of the digital format, and, when there are no base stations using the digital format, make a radio communication channel setting request to any base stations using an analog format and display an indicator of the analog format.

10. A mobile radio communication apparatus connectable via radio communication channels to base stations each using an associated transmission/reception format, comprising:

a format designating circuit for designating a particular one of a plurality of transmission/reception formats;

a first detector, which receives control signals from said base stations, for detecting the transmission/reception format used by at least one of said base stations;

a second detector for detecting a level of the control signals received from those ones of said base stations using the transmission/reception format designated by said format designating circuit;

selecting circuitry for selecting a control signal which has the strongest level among the control signals detected by said second detector; and communication circuitry for communicating with the base station which transmits the selected control signal.

11. A mobile radio communications apparatus for communicating with base stations, comprising:

a receiver for receiving signals from said base stations; and a control circuit including:

a format input control section for determining in which one of a plurality of transmission/reception formats said mobile radio communications apparatus is set; and a base station search control section for searching control channels received by said receiver to determine which, if any, of said base stations use a transmission/reception format corresponding to the transmission/reception format in which said mobile radio communications apparatus is set.

12. The radio telecommunications apparatus according to claim 11, further comprising:

a transmitter for transmitting signals to said base stations, and wherein said control circuit further comprises a call channel setting section for generating a request for establishing communication with one of said base stations using a transmission/reception format corresponding to the transmission/reception format in which said mobile radio communications apparatus is set and supplying the request to said transmitter.

13. The radio telecommunications apparatus according to claim 11, further comprising:

a display for displaying indicia regarding the transmission/reception format in which said radio communications apparatus is set.

14. A mobile radio communications apparatus for communicating with base stations, comprising:

a receiver for receiving signals from said base stations;

a transmitter for transmitting signals to said base stations; and a control circuit including:

a format input control section for determining in which one of a plurality of transmission/reception formats said mobile radio communications apparatus is set;

a base station search control section for searching control channels received by said receiver to determine which, if any, of said base stations use a transmission/reception format corresponding to the transmission/reception format in which said mobile radio communications apparatus is set and which, if any, of said base stations use a transmission/reception format not corresponding to the transmission/reception format in which said mobile radio communication apparatus is set; and a call channel setting section for generating a request for setting a communication channel in accordance with the determination by said base station search control section, and for supplying the request to said transmitter for transmission over a selected one of the control channels.

15. The radio communications apparatus according to claim 14, wherein said base station search control section selects a control channel of one of the base stations using a transmission/reception format corresponding to the transmission/reception format in which said mobile radio communication apparatus is set if said base station search control section determines that at least one of said base stations uses a transmission/reception format corresponding to the transmission/reception format in which said mobile radio communications apparatus is set.

16. The radio communications apparatus according to claim 15, wherein said base station search control section selects a control channel of one of the base stations not using a transmission/reception format corresponding to the transmission/reception format in which said mobile radio communications apparatus is set if said base station search control section determines that none of said base stations uses a transmission/reception format corresponding to the transmission/format in which said mobile radio communications apparatus is set.

* * * * *